(12) United States Patent
Rahim et al.

(10) Patent No.: US 9,315,695 B2
(45) Date of Patent: Apr. 19, 2016

(54) ACTINIC RADIATION AND MOISTURE DUAL CURABLE COMPOSITION

(71) Applicant: Dymax Corporation, Torrington, CT (US)

(72) Inventors: Marufur Rahim, Avon, CT (US); Aysegul Kascatan Nebioglu, Winsted, CT (US); Ahmet Nebioglu, Winsted, CT (US); Maria Fe Aton Audia, Torrington, CT (US)

(73) Assignee: DYMAX CORPORATION, Torrington, CT (US)

( * ) Notice: Subject to any disclaimer, the term of this patent is extended or adjusted under 35 U.S.C. 154(b) by 0 days.

(21) Appl. No.: 14/316,152

(22) Filed: Jun. 26, 2014

(65) Prior Publication Data

US 2015/0376476 A1 Dec. 31, 2015

(51) Int. Cl.

| C08F 2/46 | (2006.01) |
|---|---|
| C08F 2/50 | (2006.01) |
| C08G 61/04 | (2006.01) |
| C09J 133/14 | (2006.01) |
| C08K 5/3435 | (2006.01) |
| C08K 5/3492 | (2006.01) |
| C08K 5/134 | (2006.01) |

(52) U.S. Cl.
CPC .............. *C09J 133/14* (2013.01); *C08K 5/134* (2013.01); *C08K 5/3435* (2013.01); *C08K 5/3492* (2013.01)

(58) Field of Classification Search
USPC ......... 522/18, 12, 7, 6, 71, 189, 184, 1, 8, 13, 522/21, 22; 520/1
See application file for complete search history.

(56) References Cited

U.S. PATENT DOCUMENTS

| 5,378,735 A * | 1/1995 | Hosokawa et al. ............. 522/79 |
|---|---|---|
| 5,578,693 A | 11/1996 | Hagstrom et al. |
| 5,696,179 A * | 12/1997 | Chawla .......................... 522/90 |
| 6,777,090 B2 | 8/2004 | Baumgart et al. |
| 2002/0193460 A1* | 12/2002 | Kovar et al. ........................ 522/6 |
| 2004/0181007 A1* | 9/2004 | Acevedo et al. ............... 524/589 |
| 2010/0234485 A1* | 9/2010 | Kohli Steck et al. ......... 522/174 |
| 2012/0329897 A1* | 12/2012 | True et al. ........................ 522/26 |
| 2014/0110056 A1 | 4/2014 | Suwa et al. |
| 2014/0163130 A1 | 6/2014 | Zhang et al. |

FOREIGN PATENT DOCUMENTS

| EP | 15170886.4 | 12/2015 |
|---|---|---|
| WO | WO03/106055 A1 | 12/2003 |
| WO | 2012/138675 A1 | 10/2012 |
| WO | 2013/013589 A1 | 1/2013 |
| WO | 2013/016136 A1 | 1/2013 |
| WO | 2013/023545 A1 | 2/2013 |

\* cited by examiner

*Primary Examiner* — Ling Choi
*Assistant Examiner* — Jessica E Whiteley
(74) *Attorney, Agent, or Firm* — Roberts & Roberts, LLP

(57) ABSTRACT

A dual curable, liquid adhesive composition capable of polymerization by exposure to actinic radiation and moisture. The composition is particularly useful for liquid adhesives for electronic applications. The composition comprises an alkoxysilane functional polyurethane acrylate oligomer; a free radical polymerizable reactive diluent; a free radical photoinitiator; a catalyst for moisture curing of silane groups; and an optional alkoxysilane functional oligomer having a polyolefin group; an optional acrylate or methacrylate functional polyurethane acrylate oligomer; an optional hydroxyl terminated monoacrylate or monomethacrylate functional reactive diluent; an optional UV-absorber and hindered amine light stabilizer antioxidant; an optional wax capable of reducing oxygen inhibition; an optional 1,3 dicarbonyl compound chelating agent; an optional thixotropic agent; and an optional adhesion promoter. optional adhesion promoter.

22 Claims, No Drawings

ACTINIC RADIATION AND MOISTURE DUAL CURABLE COMPOSITION

BACKGROUND OF THE INVENTION

1. Field of the Invention

The present invention relates to a liquid, dual curable, adhesive composition capable of polymerization by exposure to actinic radiation and moisture. The composition is particularly useful as liquid adhesives for electronic applications.

2. Description of the Related Art

There is great commercial interest in producing actinic radiation curable adhesive compositions. One-part, ultraviolet (UV) and/or visible light curable, urethane acrylate adhesive compositions are known in the art, however, portions of these compositions remain unreacted and uncured when UV or visible light is blocked and prevented from striking these adhesive compositions. These shadowed areas pose a reliability risk since a less than ideal adhesive bond is formed, and the uncured, wet or tacky adhesive may chemically solubilize or otherwise attack either or both the adjoining cured adhesive areas, or its substrate, and thus weaken the adhesive bond over time. This is an especially difficult problem in optical display assemblies and edgebonding of circuit board components. This invention is directed to a UV or visible light curing adhesive that can be further moisture cured in shadow areas. WO 2012/138675 A1 and WO 2013/013589 A1 describe two-part liquid optically clear adhesive systems which contain an organic peroxide in part A and a peroxide reducing agent in part B. WO 2013/023545 A1 describes a one-part duel cure actinic radiation and heat cured liquid optically clear adhesive. In the described adhesive, a peroxide is used in the formulation that starts a curing reaction in shadow area with heat. These disclosures do not relate to moisture curable adhesives and such are not suitable for temperature sensitive components. US 2012/0329897 A1 describes a one-part actinic radiation and moisture curable liquid composition comprising at least one component (A) with alpha-(alkoxy) silane groups, with the exception of polyolefins substituted with alpha-(alkoxy)silane groups, and at least one radiation-curing component (B) with radically curable groups, where components A and components (B) are present as separate compounds. In this composition, component (B) will stay unreacted in the shadow area because it does not have moisture curable functionality. Component (A) will stay unreacted in the areas where moisture cannot penetrate because it does not have light curable functionality. In other words the moisture curable and UV curable functionalities are not present in the same molecules. U.S. Pat. No. 5,696,179 describes a radiation curable optical glass coating composition which utilizes an oligomer containing both radiation curable functionality and silane functionality. This patent does not relate to a moisture curing formulation in shadow areas. This patent discloses a composition which is targeted to create coatings that will have better moisture resistance, low water absorption and sufficient adhesion to glass. U.S. Pat. No. 6,777,090 describes a one component UV and heat dual curable system. In such a dual cure system the polymerizable molecule contains a primary or secondary carbamate group and at least one bond that can be activated by UV radiation. This system requires heat to cure the carbamate group. PCT publication WO 2013/016136 describes a dual moisture curable system. The material has a part A consisting of an oligomer with UV active polymerizable groups containing isocyanate functionalities and also may contain molecules with polyisocyanate monomers or isocyanate polymers, and a second part B which contains polyol or amine functional crosslinkers. A photoinitiator may be present in either A or B. After UV cure an addition reaction between isocyanate and hydroxyl group of the polyol continues to proceed. The part of the formulation that is not exposed to UV light will be cured by the reaction of the isocyanate and polyol. PCT publication WO2013/013589 describes a two component system having UV as well as activator curing. This two component system is cured by UV and peroxide. In the shadow areas the acrylate functionality is cured by the generation of radicals by the decomposition of peroxides when it comes in contact with an amine type reducing agent and metal based salt such copper salt.

The present invention provides a one part, actinic radiation, i.e. UV and/or visible light and moisture dual curable system utilizing a polyurethane oligomer containing both actinic radiation and moisture curable groups. (Meth)acrylate groups in the oligomer provide crosslinking sites for actinic radiation initiated free radical polymerization, and (alkoxy)silane groups provide crosslinking sites for condensation polymerization in presence of water or moisture. The composition provides a better crosslinked network and a better curing rate because the oligomer contains moisture curable and actinic radiation curable functionality at the same molecule and the formulation does not require separate oligomers for curing with actinic radiation and moisture. The liquid adhesive cures into optically clear materials with both actinic radiation and moisture. Therefore, it is ideal for bonding electronic display parts with shadow areas. Moisture can also be provided by dispensing and admixing water with the composition, or by exposing the composition to water in an atmospheric surrounding the composition. For places where moisture is hard to penetrate, adding water during dispensing accelerates moisture cure reaction significantly.

SUMMARY OF THE INVENTION

The invention provides an actinic radiation and moisture dual curable composition which comprises:

(a) from about 10 to about 90 percent by weight of at least one alkoxysilane functional polyurethane acrylate oligomer having the formula (1) or (2):

$$A\text{-}D\text{-}(P\text{-}D)_n\text{-}X \tag{1}$$

$$A\text{-}D\text{-}(P\text{-}D)_n\text{-}P\text{—}Y \tag{2}$$

wherein:
i) D is a di- or tri-functional isocyanate group;
ii) P is a polyol group having a molecular weight of from about 50 Daltons to about 10000 Daltons;
iii) n is from 1 to about 100;
iv) A is a monoalcohol functional acrylate or methacrylate group;
v) X is a methoxysilane or ethoxysilane functional group containing a urea or thiourethane linkage;
vi) Y is a methoxysilane or ethoxysilane functional group containing a urethane linkage;

(b) from 0 to about 40 percent by weight of at least one alkoxysilane functional oligomer having the formula (3) or (4):

$$Y\text{—}(PO\text{-}D)_m\text{-}PO\text{—}Y \tag{3}$$

$$X\text{-}D\text{-}(PO\text{-}D)_m\text{-}X \tag{4}$$

wherein:
i) D is a di- or tri-functional isocyanate group;
ii) PO is a polyolefin group having a molecular weight of from about 300 Daltons to about 10000 Daltons;
iii) m is from 1 to about 100;

iv) X is a methoxysilane or ethoxysilane functional group containing a urea or thiourethane linkage;
v) Y is a methoxysilane or ethoxysilane functional group containing a urethane linkage;
(c) from 0 to about 40 percent by weight of at least one acrylate or methacrylate functional polyurethane acrylate oligomer having the formula (5);

$$A\text{-}D\text{-}(P\text{-}D)_k\text{-}A \qquad (5)$$

wherein;
i) D is a di- or tri-functional isocyanate group;
ii) P is a polyol group having a molecular weight of from about 50 Daltons to about 10000 Daltons;
iii) k is from 1 to about 100;
iv) A is a monoalcohol functional acrylate or methacrylate group;
(d) from 0 to about 20 percent by weight of at least one hydroxyl terminated monoacrylate or monomethacrylate functional reactive diluent;
(e) from 1 to about 60 percent by weight of at least one free radical polymerizable reactive diluent;
(f) from about 0.1 to about 10 percent by weight of at least one free radical photoinitiator;
(g) from about 0.01 to about 3 percent by weight of at least one catalyst for moisture curing of silane groups;
(h) from 0 to about 3 percent by weight of a UV-absorber and hindered amine light stabilizer antioxidant;
(i) from 0 to about 15 percent by weight of a wax capable of reducing oxygen inhibition;
(j) from 0 to about 3 percent by weight of 1,3 dicarbonyl compound chelating agent;
(k) from 0 to about 10 percent by weight of a thixotropic agent;
(l) from 0 to about 10 percent by weight of an adhesion promoter.

The invention also provides a method of curing an actinic radiation and moisture dual curable composition which comprises:
A) providing an actinic radiation and moisture dual curable composition from above;
B) providing water to the composition; and
C) exposing the composition to sufficient actinic radiation to at least partially polymerize or crosslink the composition.

DESCRIPTION OF THE INVENTION

The actinic radiation and moisture dual curable composition is formed by combining components (a) through (j) as indicated above. Component (a) comprises from about 10 to about 90 percent by weight of at least one alkoxysilane functional polyurethane acrylate oligomer having the formula (1) or (2):

$$A\text{-}D\text{-}(P\text{-}D)_n\text{-}X \qquad (1)$$

$$A\text{-}D\text{-}(P\text{-}D)_n\text{-}P\text{—}Y \qquad (2)$$

wherein:
i) D is a di- or tri-functional isocyanate group;
ii) P is a polyol group having a molecular weight of from about 50 Daltons to about 10000 Daltons;
iii) n is from 1 to about 100;
iv) A is a monoalcohol functional acrylate or methacrylate group;
v) X is a methoxysilane or ethoxysilane functional group containing a urea or thiourethane linkage;
vi) Y is a methoxysilane or ethoxysilane functional group containing a urethane linkage.

Non-exclusive examples of isocyanates useful for forming the isocyanate group D comprise one or more of hexamethylene diisocyanate, hexamethylene diisocyanate isocyanurate, trimethyl hexamethylene diisocyanate, bis(4-isocyanatocyclohexyl)methane, isophorone diisocyanate, tetramethylxylene diisocyanate, trimethylhexamethylene diisocyanate, toluene diisocyanate, and isophorone diisocyanate.

Non-exclusive examples of suitable polyols useful for forming the polyol groups P include polyester glycol, polypropylene glycol, polytetramethylene glycol, polycaprolactone glycol, polycarbonate glycol and polyolefin polyols like hydroxyl terminated polybutadiene, hydroxyl terminated hydrogenated polybutadiene and hydroxyl terminated hydrogenated isoprene. The polyol groups P have a molecular weight of from about 50 to about 10000 Daltons, preferably from about 500 to about 5000 Daltons, and more preferably from 1000 to about 3000 Daltons.

Non-exclusive examples of suitable mono alcohol functional capping useful for forming the monohydroxyl functional (meth)acrylate group A include 2-hydroxyethyl acrylate, 2-hydroxyethyl methacrylate, hydroxypropyl acrylate, hydroxypropyl methacrylate, 4-hydroxybutyl acrylate, and 4-hydroxybutyl methacrylate.

Non-exclusive examples of suitable amine or thiol functional alkoxysilane capping compounds useful for forming the alkoxysilane functional group X containing urea or thiourethane linkages include gamma-aminopropyltrimethoxysilane, gamma-aminopropyltriethoxysilane, N-beta-(aminoethyl)-gamma-aminopropyltrimethoxysilane, bis-(gamma-trimethoxysilylpropyl)amine, bis-(gamma-triethoxysilylpropyl)amine, n-ethyl-3-trimethoxysilyl-2-methylpropanamine, N-cyclohexylaminomethyltriethoxysilane, N-cyclohexylaminomethylmethyldiethoxysilane, N-cyclohexyl-3-aminopropyltrimethoxysilane, gamma-mercaptopropyltrimethoxysilane, and gamma-mercaptopropyltriethoxysilane.

Non-exclusive examples of suitable isocyanate functional alkoxysilane capping compounds useful for forming the alkoxysilane functional group Y containing urethane linkages include gamma-isocyanatopropyltriethoxysilane and gamma-isocyanatopropyltrimethoxysilane.

The component (a) alkoxysilane functional polyurethane acrylate oligomer is known in the art and can be produced according to U.S. Pat. No. 5,696,179, the published specification of which is incorporated herein by reference. The component (a) alkoxysilane functional polyurethane acrylate oligomer is present in the actinic radiation and moisture dual curable composition in an amount of from about 10 to about 90 percent by weight, preferably from about 20 to about 75 percent by weight, and more preferably from about 30 to about 60 percent by weight.

Component (b) comprises from 0 to about 40 percent by weight of at least one alkoxysilane functional oligomer having the formula (3) or (4):

$$Y\text{—}(PO\text{-}D)_m\text{-}PO\text{—}Y \qquad (3)$$

$$X\text{-}D\text{-}(PO\text{-}D)_m\text{-}X \qquad (4)$$

wherein:
i) D is a di- or tri-functional isocyanate group;
ii) PO is a polyolefin group having a molecular weight of from about 300 Daltons to about 10000 Daltons;
iii) m is from 1 to about 100;
iv) X is a methoxysilane or ethoxysilane functional group containing a urea or thiourethane linkage;

v) Y is a methoxysilane or ethoxysilane functional group containing a urethane linkage.

Non-exclusive examples of isocyanates useful for forming the isocyanate group D, the alkoxysilane functional group X containing urea or thiourethane linkages, the alkoxysilane functional group Y containing urethane linkages are as given above for component (a). Non-exclusive examples of suitable polyols useful for forming the polyolefin groups PO include polyolefin polyols like hydroxyl terminated polybutadiene, hydroxyl terminated hydrogenated polybutadiene and hydroxyl terminated hydrogenated isoprene, The polyol groups PO have a molecular weight of from about 300 to about 10000 Daltons, preferably from about 500 to about 5000 Daltons, and more preferably from 1000 to about 4000 Daltons.

The component (b) alkoxysilane functional oligomer is known in the art and can be produced according to U.S. patent application 2012/0329897 A1, the published specification of which is incorporated herein by reference. The component (b) alkoxysilane functional oligomer is present in the actinic radiation and moisture dual curable composition in an amount of from about 0 to about 40 percent by weight, preferably from about 0 to about 30 percent by weight, and more preferably from about 0 to about 20 percent by weight.

Component (c) comprises from 0 to about 40 percent by weight of at least one acrylate or methacrylate functional polyurethane acrylate oligomer having the formula (5);

A-D-(P-D)$_k$-A (5)

wherein;
i) D is a di- or tri-functional isocyanate group;
ii) P is a polyol group having a molecular weight of from about 50 Daltons to about 10000 Daltons;
iii) k is from 1 to about 100;
iv) A is a monoalcohol functional acrylate or methacrylate group;

Non-exclusive examples of isocyanates useful for forming the isocyanate group D, polyol group P, monohydroxyl functional acrylate or methacrylate group A are as given above for components (a) and (b) above.

The component (c) acrylate or methacrylate functional polyurethane acrylate oligomer is known in the art and can be produced according to U.S. Pat. No. 5,578,693, the published specification of which is incorporated herein by reference. The component (c) acrylate or methacrylate functional polyurethane acrylate oligomer is present in the actinic radiation and moisture dual curable composition in an amount 0 to about 40, preferably from about 0 to about 30 percent by weight, and more preferably from about 0 to about 20 percent by weight.

The actinic radiation and moisture dual curable composition then may contain a component (d) which is one or more hydroxyl terminated monoacrylate or monomethacrylate functional reactive diluents. Non-exclusive examples of suitable hydroxyl terminated mono-monoacrylate or monomethacrylate functional reactive diluent include 2-hydroxyethyl acrylate, 2-hydroxyethyl methacrylate, hydroxypropyl acrylate, hydroxypropyl methacrylate, 4-hydroxybutyl acrylate, and 4-hydroxybutyl methacrylate. The hydroxyl terminated mono-monoacrylate or monomethacrylate functional reactive diluent concentration in the actinic radiation and moisture dual curable composition ranges from 0 to about 20 percent by weight; preferably from about 1 percent to about 20 percent by weight, more preferably from about 2 percent to about 15 percent by weight, and most preferably from 4 percent to about 10 percent by weight.

The actinic radiation and moisture dual curable composition then contain a component (e) which comprises one or more free radical polymerizable reactive diluents. Non-exclusive examples of suitable free radical polymerizable reactive diluents include isobornyl acrylate, isobornyl methacrylate, lauryl acrylate, lauryl methacrylate, isodecyl acrylate, isodecyl methacrylate, 2-ethylhexyl acrylate, 2-ethylhexyl methacrylate, tetrahydrofurfuryl acrylate, tetrahydrofurfuryl methacrylate, 2-(2-ethoxyethoxy)|ethyl acrylate, 2-(2-ethoxyethoxy)|ethyl acrylate, 3,3,5 trimethylcyclohexyl methacrylate, cyclic trimethylolpropane formal acrylate, dicyclopentadienyl methacrylate, octyldecyl acrylate, octyldecyl methacrylate, N,N-dimethyl acrylamide, N-vinyl caprolactam, 4-acryloyl morpholine, 1,6 hexanediol diacrylate and trimethylolpropane triacrylate. The free radical polymerizable reactive diluent concentration in the actinic radiation and moisture dual curable composition ranges from about 1 percent to about 60 percent by weight, preferably from about 5 percent to about 40 percent by weight, and more preferably from 10 percent to about 30 percent by weight.

The actinic radiation and moisture dual curable composition then contain a component (f) of one or more free radical photoinitiators. Non-exclusive examples of useful free radical polymerization photoinitiators include aromatic ketones. Preferred examples thereof include benzophenone, 2-hydroxy-2-methylpropiophenone, 1-hydroxycyclohexyl phenyl ketone, 2-Hydroxy-2-methyl-1-[4-(1-methylvinyl)phenyl]propanone homopolymer, 2,2-diethoxyacetophenone, camphorquinone, 2,2-dimethoxy-2-phenylacetophenone, methylbenzoyl formate diphenyl(2,4,6-trimethylbenzoyl) phosphine oxide, and phenylbis(2,4,6-trimethylbenzoyl) phosphine oxide. The total concentration of radical polymerization photoinitiators in the formulation is from about 0.1 percent to about 10 percent by weight, preferably from about 0.5 percent to about 6 percent by weight, and more preferably from 1 percent to about 4 percent by weight.

The actinic radiation and moisture dual curable composition then contain a component (g) which comprises one or more catalysts for moisture curing of silane groups. Non-exclusive examples of useful catalysts for moisture curing of silane groups include organic and inorganic acids such as acrylic acid, methacrylic acid, maleic acid, acetic acid, hydrochloric acid, and phosphoric acid and its esters, basic compounds such as triethanol amine, N,N-dimethylcyclohexylamine, 1,4-diazabicyclo[2.2.2]octane, tetramethylene guanidine (TMG), photolatent catalysts such as Solyfast™ 0010, 1,5-diazabicyclo[4.3.0]non-5-ene and its derivatives, organometallic compounds such as dibutyltindilaurate (DBTDL), dibutyltin oxide, stannous octoate, dibutyltin diacetate, bismuth neodecanoate, zinc neodecanoate and tetrabutyl titanate. The moisture cure catalyst concentration in the actinic radiation and moisture dual curable composition ranges from about 0.01 percent to about 3 percent by weight, preferably from about 0.05 percent to about 2 percent by weight, and more preferably from 0.1 percent to about 1 percent by weight.

The actinic radiation and moisture dual curable composition then contain a component (h) which comprises one or more UV-absorber and hindered amine light stabilizer antioxidants. Non-exclusive examples of useful UV-absorbers and hindered amine light stabilizer are 2-(2-Hydroxy-3,5-di-tert-amylphenyl)-2H-benzotriazole, 2-Ethoxy-2'-ethyloxalic acid bisanilide, 2,4,6-Tris[4-(1-octyloxycarbonyl)ethyloxy-2-hydroxyphenyl]-1,3,5-triazine, 2,2'-Methylenebis[4-(1,1,3,3-tetramethylbutyl)-6-(2H-benzotriazol-2-yl)phenol], 2-(2-Hydroxy-5-methacryloyloxyethylphenyl)-2H-benzotriazole, 2-(2-Hydroxy-3,5 dicumyl)benzotriazole, Bis(1,2,2, 6,6-pentamethyl-4-piperidinyl) sebacate, Methyl(1,2,2,6,6-pentamethyl-4-piperidinyl)sebacate, and 4-Hydroxy-2,2,6,6-tetramethyl-1-piperidinethanol-dimethyl succinate copolymer. The amount of UV-absorbers and hindered amine light stabilizers in the in the actinic radiation and moisture dual curable composition range from about 0 percent to about 3 percent by weight, preferably from about 0.1 percent to about 2 percent by weight, and more preferably from about 0.2 percent to about 1 percent by weight.

The actinic radiation and moisture dual curable composition then may contain a component (i) which comprises a wax capable of reducing oxygen inhibition. Non-exclusive examples of useful waxes are polyethylene waxes, polyamide waxes, Teflon waxes, Carnauba waxes, polypropylene waxes and combinations thereof. In one embodiment, such are present in the actinic radiation and moisture dual curable composition in an amount of from 0 to about 15 percent by weight, preferably from about 0 to about 10 percent by weight, and more preferably from about 0 to about 5 percent by weight.

The actinic radiation and moisture dual curable composition then may contain a component (j) which comprises a 1,3 dicarbonyl compound chelating agent. Non-exclusive examples of useful 1,3 dicarbonyl compound chelating agents include 2,4-pentanedione, methyl acetoacetate, dimethylmalonate, N-methylacetoacetamide, acetoacetamide, and malonamide. The amount of 1,3 dicarbonyl compound chelating agents in the actinic radiation and moisture dual curable composition ranges from 0 to about 3 percent by weight preferably from about 0 to about 2 percent by weight, and more preferably from about 0 to about 1 percent by weight.

The actinic radiation and moisture dual curable composition then may contain a component (k) which comprises a thixotropic agent. Non-exclusive examples of useful thixotropic agents are include bentonite, sodium silicate, magnesium silicate, fluorine silicate, lithium silicate, silicon dioxide, fumed silicon dioxide (silica), (meth)acrylate functionalized fumed silica, polydimethylsiloxane modified silica, titanates, mineral pigments, polyacrylamide, cellulose acetate propionate (CAP), cellulose acetate butyrate (CAB), acrylamide functionalized CAB and combinations thereof. In one embodiment, such are present in the actinic radiation and moisture dual curable composition in an amount of from 0 to about 10 percent by weight, from about 0 to about 8 percent by weight, and more preferably from about 0 to about 5 percent by weight.

The actinic radiation and moisture dual curable composition then may optionally contain a component (l) which comprises an adhesion promoter. Non-exclusive examples of useful adhesion promoters are gamma-ethacryloxypropyltrimethoxy silane, beta (3,4 epoxycyclohexyl)ethyltrimethoxy silane, gamma-glycidoxypropyl trimethoxysilane, gamma-glycidoxypropyl triethoxysilane, vinyl trimethoxysilane, vinyl triethoxysilane, (meth) acrylic phosphonic acid esters, (meth)acrylic phosphate acid esters, (meth)acrylic acid, β-carboxyethyl acrylate, and other carboxylic acid functional acrylate esters. Such may be present in the actinic radiation and moisture dual curable composition in an amount of from about 0 percent by weight to about 10 percent by weight, preferably from about 0 percent by weight to about 5 percent by weight, and more preferably from about 0 percent by weight to about 3 percent by weight.

In use the actinic radiation and moisture dual curable composition is provided with water. Water may be provided to the composition by exposing the composition to water in an atmosphere surrounding the composition or by admixing water with the composition. The amount of water that can be added during dispensing or application varies from about 0 percent by weight to about 5 percent by weight, preferably from about 0.2 percent by weight to about 3 percent by weight and more preferably from about 0.5 percent by weight to about 1 percent by weight based on the weight of the actinic radiation and moisture dual curable composition.

The composition may be prepared by admixing the composition components until a substantially homogenous fluid is formed. In one use, the composition is formed, and applied as a coating to a substrate surface at a thickness of from about 0.0001 inch to about 0.5 inch. In another embodiment, is first applied to a substrate surface as above and then attached to another substrate so that the mixture performs as an adhesive. Any suitable substrate may be used such as metals, plastics and the like.

The composition may then be exposed to sufficient actinic radiation to initiate curing of the composition. Polymerization may be initiated by exposure to ultraviolet, visible light, electron beam radiation or combinations thereof, usually wavelength of having a wavelength in the 200-500 nm range, preferably from about 300 nm to about 465 nm. The length of time for exposure is easily determined by those skilled in the art and depends on the selection of the particular components of the radiation curable composition. Typically exposure ranges from about 0.2 second to about 120 seconds, preferably from about 0.5 seconds to about 60 seconds, and more preferably from about 0.5 seconds to about 30 seconds. Typical exposure intensities range from about 5 mW/cm$^2$ to about 2500 mW/cm$^2$, preferably from about 50 mW/cm$^2$ to about 1500 mW/cm$^2$, and more preferably from about 100 mW/cm$^2$ to about 1000 mW/cm$^2$.

When the composition is exposed, a free-radical reaction (radical chain-growth polymerization) occurs which reacts with component (a), as well as components (b) and (c) if present. In a dark reaction, the non-photo-reacted composition undergoes moisture crosslinking over time in shadow areas due to the moisture curable sites on the oligomer, which have remained unreacted when there is no actinic light penetration. The composition cures into optically clear materials.

The composition may optionally further comprise a heat stabilizer, UV-light stabilizers, free-radical scavengers, dyes, pigments, surfactants, plasticizers, opacity-modifying agents, antioxidants, surfactants, fillers, flame retardants, and combinations thereof.

The following non-limiting examples serve to illustrate the invention.

EXAMPLES

Table 1 shows three examples of the inventive composition for optical display adhesives and a comparative composition. Example A contains a polyolefin polyol based silane functional polyurethane acrylate (SPUA#1) and silane terminated polyolefin polyol based urethane (STPUA). Instead of polyolefin based ingredients, Example B contains a tri-functional polyether polyol based silane functional polyurethane acrylate (SPUA#2). Comparative example D does not have silane functional polyurethane acrylate, it only has a (meth)acrylate functional polyurethane oligomer (PUA). Formulation components were admixed. In order to test propagation through moisture cure by diffusion of atmospheric moisture, examples were deposited between two 30×40×2 mm clear float glass slides separated by 5 mil thick spacers (open mold). As controls, adhesives were also put into a 5 mil thick polyethylene terephthalate mold between glass slides which prohibits any atmospheric moisture to diffuse into the adhesives (closed mold). Properties are shown in Table 2. Propagation of cure at the end of first day, third day, and sixth day at 20° C. and 20% relative humidity (RH), are given in Table 3. There was no curing in the adhesives poured into closed molds.

TABLE 1

|  | Example A | Example B | Example C | Comparative Example D |
|---|---|---|---|---|
| SPUA#1[a] | 37.14 | — | — | — |
| STPU[b] | 32.86 | — | — | — |
| SPUA#2[c] | — | 70 | 70.94 | — |
| PUA[d] | — | — | — | 26 |
| Polyolefin Polyol | — | — | — | 23 |
| Lauryl Acrylate | 15.2 | 15.2 | 15.2 | 16.9 |
| Isobornyl Acrylate | 0.9 | 0.9 | — | 20.3 |
| 2-Hydroxyethyl Methacrylate | 10 | 10 | 10 | 10 |
| Photoinitiator #1[e] | 3 | 3 | 3 | 3 |
| Photoinitiator #2[f] | 0.3 | 0.3 | 0.3 | 0.3 |
| UV-absorber[g] | 0.2 | 0.2 | 0.2 | 0.2 |
| HALS[h] | 0.2 | 0.2 | 0.2 | 0.2 |
| Antioxidant[i] | 0.1 | 0.1 | 0.1 | 0.1 |
| Dibutyltindilaurate | 0.1 | 0.1 | — | — |
| Tetramethylene guanidine | — | — | 0.06 | — |
| Total | 100 | 100 | 100 | 100 |

[a] SPUA#1: Methoxysilane functional polyurethane acrylate based on a polyolefin polyol
[b] STPU: Methoxysilane functional urethane based on a polyolefin polyol
[c] SPUA#2: Methoxysilane functional polyurethane acrylate based on tri-functional polypropylene glycol polyol
[d] SPUA#2: Polyurethane acrylate based on a polyolefin polyol
[e] Photoinitiator #1: 1-Hydroxycyclohexyl phenyl ketone
[f] Photoinitiator #2: Phenylbis(2,4,6-trimethylbenzoyl)phosphine oxide
[g] UV-absorber: 2-[4,6-bis(2,4-dimethylphenyl)-1,3,5-triazin-2-yl]-5-[2-hydroxy 3-(dodecyloxy- and tridecyloxy)propoxy]phenols
[h] HALS: Bis(1,2,2,6,6-pentamethyl-4-piperidinyl) sebacate
[i] Antioxidant: Neopentanetetrayl 3,5-di-tert-butyl-4-hydroxyhydrocinnamate

TABLE 2

|  | Example A | Example B | Example C | Comparative Example D |
|---|---|---|---|---|
| Initial viscosity (cP) | 1319 | 409 | 516 | 956 |
| Viscosity (cP) after 14 days aging at 40° C. | 1472 | 522 | 619 | 978 |
| Shore Hardness | 00-50 | 00-25 | 00-54 | 00-70 |

TABLE 3

|  | Propagation at 20° C., 20% RH, open mold | | | | Propagation at 20° C., 20% RH, closed mold | | | |
|---|---|---|---|---|---|---|---|---|
| Example | A | B | C | D | A | B | C | D |
| Day 1 (mm) | 1 | 1 | 2.5 | wet | wet | wet | wet | wet |
| Day 3 (mm) | 2 | 2 | 7 | wet | wet | wet | wet | wet |
| Day 6 (mm) | 4 | 6 | 9 | wet | wet | wet | wet | wet |

An important part of this invention is that addition of a small amount of water does not affect optically clarity of both the liquid adhesive and UV-visible light cured adhesive. Table 4 provides results of curing of silane groups with the addition of water. As seen in Table 4, addition of equivalent amounts of water to react silane groups provides curing within the first day. Small amount of water can be provided during dispensing and application. Change of yellowness (b*) values with water addition and with reliability testing at 85° C. and 85% relative humidity (R.H.) are as given in Table 5. Yellowness results for a radiation-only curable (no moisture curing) Comparative Example D are also given. Yellowness results of invented composition are similar or lower compared to the Comparative Example D.

TABLE 4

|  | Closed mold, no water addition | | | | Closed mold, water added (0.6% by weight) | | | |
|---|---|---|---|---|---|---|---|---|
| Example | A | B | C | D | A | B | C | D |
| Day 1 | wet | wet | wet | wet | cured | cured | cured | wet |
| Day 3 | wet | wet | wet | wet | — | — | — | wet |
| Day 6 | wet | wet | wet | wet | — | — | — | wet |

TABLE 5

|  | No water addition | | Water added | |
|---|---|---|---|---|
|  | Initial | After 21 days of 85° C./85% R.H. | Initial | After 21 days of 85° C./85% R.H. |
| Example A | 0.05 | 0.20 | 0.07 | 0.14 |
| Example B | 0.15 | 0.46 | 0.17 | 0.55 |
| Comparative Example D | 0.13 | 0.24 | Not applicable | Not applicable |

The low initial yellowness and the final yellowness after 85° C./85% R.H are extremely critical for the display lamination unit such as a tablet, cell phone screen, etc.

Table 6 shows an inventive formulation for an edge-bonding adhesive application. Example E contains a tri-functional polyether polyol based silane functional polyurethane acrylate (SPUA#2) and a polyester polyol based polyurethane acrylate (PUA#2).

TABLE 6

|  | Example E |
|---|---|
| SPUA#2[a] | 29 |
| PUA#2[b] | 20 |
| N,N-dimethyl acrylamide | 14.5 |
| Isobornyl Acrylate | 8 |
| N-vinyl caprolactam | 14.7 |
| 1-Hydroxy-1-methylethyl phenyl ketone | 2.5 |
| (2,4,6-Trimethylbenzoyl) diphenylphosphine oxide | 0.5 |
| Vinyl trimethoxysilane | 1 |
| Polyethylene wax | 4 |
| 2,4-pentanedione | 0.5 |
| Dibutyltindilaurate | 0.1 |
| Polydimethylsiloxane modified silica | 5.2 |
| Total | 100 |

[a] SPUA#2: Methoxysilane functional polyurethane acrylate based on tri-functional polypropylene glycol polyol
[b] PUA#2: Polyurethane acrylate based on a polyester polyol Example E is a thixotropic liquid with properties as given in Table 7. Viscosity of the sample was measured at 25° C. using Brookfield RIS Plus Rheometer. The thixo and recovery ratios were calculated by the following formulas;

Thixo ratio=(Solution first viscosity at 0.3 shear rate)/(Solution viscosity at 3.0 shear rate)

Recovery ratio=(Solution last viscosity at 0.3 shear rate)/(Solution viscosity at 3.0 shear rate)

An important part of this invention is that rheological properties of the liquid material are not affected during accelerated aging conditions (21 days aging @ 40° C., 50% RH).

TABLE 7

|  | Viscosity (cP) | Thixo Ratio | Recovery Ratio |
|---|---|---|---|
| Initial | 40,000 | 7 | 5 |
| After 21 days aging @ 40° C., 50% RH | 39,000 | 8 | 5 |

In order to test moisture curing property of Example E, 20 mil thick films were prepared and left at 25° C., 50% RH. As given in Table 8, films were cured at day 4.

TABLE 8

| Moisture curing at 25° C., 50% RH 20 mil film, open air | |
|---|---|
| Day 1 | wet |
| Day 2 | wet |
| Day 3 | wet |
| Day 4 | cured |
| Day 5 | cured |

Mechanical properties of the cured materials were measured and monitored to see the changes as moisture curing progresses. Results ware as given in Table 9. Tensile samples were made as per ASTM D638 and pulled on an Instron Model 4467 using a 200-lb load cell at a speed of 1.0 inch/min. Samples were cured with 3000 mJ/cm² UV energy then stored at room temperature before pulling.

TABLE 9

|  | Tensile Strength (psi) | Elongation (%) | Modulus (psi) | Tg (° C.) |
|---|---|---|---|---|
| UV cure only | 1,302 | 219 | 6,566 | 60 |
| UV + 7 days | 1,212 | 178 | 7,872 | 62 |
| UV + 14 days | 1,337 | 140 | 9,370 | 73 |

Adhesion performances over time are given in Table 10. A chip component is bonded into a black circuit boards by dispensing a bead of adhesive onto the four corners of the chip component. Cured with 3000 mJ/cm² UV energy and stored at room temperature before pulling on an Instron Model 4467 using a 200-lb load cell. Thru ocular inspection, it was also noted whether the cured adhesive delaminates when cured on top of a residual flux. It was observed that with additional moisture curing adhesion pull strength was increased by three times.

TABLE 10

|  | Pull Strength (lbf) | Ocular inspection |
|---|---|---|
| UV cure only | 11 | No delamination |
| UV + 7 days* | 33 | No delamination |

*At 25° C. and 50% RH

SUMMARY

The invented actinic radiation and moisture dual curable composition is ideal for electronics applications where there are shadowed areas which pose reliability risk. The composition provides a good curing rate because it contains at least one oligomer which has both moisture curable and actinic radiation curable functionality at the same molecule. The liquid adhesive can be cured into optically clear materials with both actinic radiation and moisture. Moisture can be provided by admixing water during dispensing or from the moisture in the atmosphere. Adding water during dispensing accelerates moisture cure reaction significantly. Invention Examples A, B and C are particularly useful for liquid optically clear applications and Example E is useful for edgebonding of circuit board components.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An actinic radiation and moisture dual curable composition which comprises:
   (a) from about 10 to about 90 percent by weight of at least one alkoxysilane functional polyurethane acrylate oligomer having the formula (1) or (2):

$$A\text{-}D\text{-}(P\text{-}D)_n\text{-}X \tag{1}$$

$$A\text{-}D\text{-}(P\text{-}D)_n\text{-}P\text{—}Y \tag{2}$$

wherein:
   i) D is a di- or tri-functional isocyanate group;
   ii) P is a polyol group having a molecular weight of from about 50 Daltons to about 10000 Daltons;
   iii) n is from 1 to about 100;
   iv) A is a monoalcohol functional acrylate or methacrylate group;
   v) X is a methoxysilane or ethoxysilane functional group containing a urea or thiourethane linkage;
   vi) Y is a methoxysilane or ethoxysilane functional group containing a urethane linkage;
   (b) from 0 to about 40 percent by weight of at least one alkoxysilane functional oligomer having the formula (3) or (4):

$$Y\text{—}(PO\text{-}D)_m\text{-}PO\text{—}Y \tag{3}$$

$$X\text{-}D\text{-}(PO\text{-}D)_m\text{-}X \tag{4}$$

wherein:
   i) D is a di- or tri-functional isocyanate group;
   ii) PO is a polyolefin group having a molecular weight of from about 300 Daltons to about 10000 Daltons;
   iii) m is from 1 to about 100;
   iv) X is a methoxysilane or ethoxysilane functional group containing a urea or thiourethane linkage;
   v) Y is a methoxysilane or ethoxysilane functional group containing a urethane linkage;
   (c) from 0 to about 40 percent by weight of at least one acrylate or methacrylate functional polyurethane acrylate oligomer having the formula (5);

$$A\text{-}D\text{-}(P\text{-}D)_k\text{-}A \tag{5}$$

wherein;
   i) D is a di- or tri-functional isocyanate group;
   ii) P is a polyol group having a molecular weight of from about 50 Daltons to about 10000 Daltons;
   iii) k is from 1 to about 100;
   iv) A is a monoalcohol functional acrylate or methacrylate group;
   (d) from 0 to about 20 percent by weight of at least one hydroxyl terminated monoacrylate or monomethacrylate functional reactive diluent;
   (e) from 1 to about 60 percent by weight of at least one free radical polymerizable reactive diluent;

(f) from about 0.1 to about 10 percent by weight of at least one free radical photoinitiator;
(g) from about 0.01 to about 3 percent by weight of at least one catalyst for moisture curing of silane groups;
(h) from 0 to about 3 percent by weight of a UV-absorber and hindered amine light stabilizer antioxidant;
(i) from 0 to about 15 percent by weight of a wax capable of reducing oxygen inhibition;
(j) from 0 to about 3 percent by weight of 1,3 dicarbonyl compound chelating agent;
(k) from 0 to about 10 percent by weight of a thixotropic agent;
(l) from 0 to about 10 percent by weight of an adhesion promoter.

2. The composition of claim 1 further comprising water.

3. The composition of claim 1 comprising the alkoxysilane functional polyurethane acrylate oligomer having the formula (1).

4. The composition of claim 1 comprising the alkoxysilane functional polyurethane acrylate oligomer having the formula (2).

5. The composition of claim 1 comprising both the alkoxysilane functional polyurethane acrylate oligomer having the formula (1) and the alkoxysilane functional polyurethane acrylate oligomer having the formula (2).

6. The composition of claim 1 wherein at least one of the following are present: at least one alkoxysilane functional oligomer having the formula (3) or (4); at least one acrylate or methacrylate functional polyurethane acrylate oligomer having the formula (5); at least one hydroxyl terminated monoacrylate or monomethacrylate functional reactive diluent; a UV-absorber and hindered amine light stabilizer antioxidant; a wax capable of reducing oxygen inhibition; 1,3 dicarbonyl compound chelating agent; a thixotropic agent; an adhesion promoter.

7. The composition of claim 1 wherein each of the following are present: at least one of at least one alkoxysilane functional oligomer having the formula (3) or (4); at least one acrylate or methacrylate functional polyurethane acrylate oligomer having the formula (5); at least one hydroxyl terminated monoacrylate or monomethacrylate functional reactive diluent; a UV-absorber and hindered amine light stabilizer antioxidant; a wax capable of reducing oxygen inhibition; 1,3 dicarbonyl compound chelating agent; a thixotropic agent; an adhesion promoter.

8. The composition of claim 1 which comprises:
component (a) in an amount of from about 20 to about 75 percent by weight;
component (b) in an amount of from 0 to about 30 percent by weight
component (c) in an amount of from 0 to about 30 percent by weight
component (d) in an amount of from 1 to about 20 percent by weight
component (e) in an amount of from 5 to about 40 percent by weight
component (f) in an amount of from about 0.5 to about 6 percent by weight;
component (g) in an amount of from about 0.05 to about 2 percent by weight;
component (h) in an amount of from 0.1 to about 2 percent by weight;
component (i) in an amount of from 0 to about 10 percent by weight;
component (j) in an amount of from 0 to about 2 percent by weight;
component (k) in an amount of from 0 to about 8 percent by weight;
component (l) in an amount of from 0 to about 5 percent by weight.

9. The composition of claim 1 which comprises:
component (a) in an amount of from about 30 to about 60 percent by weight;
component (b) in an amount of from 0 to about 20 percent by weight
component (c) in an amount of from 0 to about 20 percent by weight
component (d) in an amount of from 2 to about 15 percent by weight
component (e) in an amount of from 10 to about 30 percent by weight
component (f) in an amount of from about 1 to about 4 percent by weight;
component (g) in an amount of from about 0.1 to about 1 percent by weight;
component (h) in an amount of from 0.2 to about 1 percent by weight;
component (i) in an amount of from 0 to about 5 percent by weight;
component (j) in an amount of from 0 to about 1 percent by weight;
component (k) in an amount of from 0 to about 5 percent by weight;
component (l) in an amount of from 0 to about 3 percent by weight.

10. A method of curing an actinic radiation and moisture dual curable composition which comprises:
A) providing an actinic radiation and moisture dual curable composition which comprises:
(a) from about 10 to about 90 percent by weight of at least one alkoxysilane functional polyurethane acrylate oligomer having the formula (1) or (2):

$$A\text{-}D\text{-}(P\text{-}D)_n\text{-}X \qquad (1)$$

$$A\text{-}D\text{-}(P\text{-}D)_n\text{-}P\text{—}Y \qquad (2)$$

wherein:
i) D is a di- or tri-functional isocyanate group;
ii) P is a polyol group having a molecular weight of from about 50 Daltons to about 10000 Daltons;
iii) n is from 1 to about 100;
iv) A is a monoalcohol functional acrylate or methacrylate group;
v) X is a methoxysilane or ethoxysilane functional group containing a urea or thiourethane linkage;
vi) Y is a methoxysilane or ethoxysilane functional group containing a urethane linkage;
(b) from 0 to about 40 percent by weight of at least one alkoxysilane functional oligomer having the formula (3) or (4):

$$Y\text{—}(PO\text{-}D)_m\text{-}PO\text{—}Y \qquad (3)$$

$$X\text{-}D\text{-}(PO\text{-}D)_m\text{-}X \qquad (4)$$

wherein:
i) D is a di- or tri-functional isocyanate group;
ii) PO is a polyolefin group having a molecular weight of from about 300 Daltons to about 10000 Daltons;
iii) m is from 1 to about 100;
iv) X is a methoxysilane or ethoxysilane functional group containing a urea or thiourethane linkage;
v) Y is a methoxysilane or ethoxysilane functional group containing a urethane linkage;

(c) from 0 to about 40 percent by weight of at least one acrylate or methacrylate functional polyurethane acrylate oligomer having the formula (5);

A-D-(P-D)$_k$-A    (5)

wherein;
i) D is a di- or tri-functional isocyanate group;
ii) P is a polyol group having a molecular weight of from about 50 Daltons to about 10000 Daltons;
iii) k is from 1 to about 100;
iv) A is a monoalcohol functional acrylate or methacrylate group;

(d) from 0 to about 20 percent by weight of at least one hydroxyl terminated monoacrylate or monomethacrylate functional reactive diluent;
(e) from 1 to about 60 percent by weight of at least one free radical polymerizable reactive diluent;
(f) from about 0.1 to about 10 percent by weight of at least one free radical photoinitiator;
(g) from about 0.01 to about 3 percent by weight of at least one catalyst for moisture curing of silane groups;
(h) from 0 to about 3 percent by weight of a UV-absorber and hindered amine light stabilizer antioxidant;
(i) from 0 to about 15 percent by weight of a wax capable of reducing oxygen inhibition;
(j) from 0 to about 3 percent by weight of 1,3 dicarbonyl compound chelating agent;
(k) from 0 to about 10 percent by weight of a thixotropic agent;
(l) from 0 to about 10 percent by weight of an adhesion promoter; and B) providing water to the composition; and
C) exposing the composition to sufficient actinic radiation to at least partially polymerize or crosslink the composition.

11. The method of claim 10 wherein water is provided to the composition by exposing the composition to water in an atmosphere surrounding the composition.

12. The method of claim 10 wherein water is provided to the composition by admixing water with the composition.

13. The method of claim 10 wherein the composition comprises the alkoxysilane functional polyurethane acrylate oligomer having the formula (1).

14. The method of claim 10 wherein the composition comprises the alkoxysilane functional polyurethane acrylate oligomer having the formula (2).

15. The method of claim 10 wherein the composition comprises both the alkoxysilane functional polyurethane acrylate oligomer having the formula (1) and the alkoxysilane functional polyurethane acrylate oligomer having the formula (2).

16. The method of claim 10 wherein the composition comprises at least one of the following: at least one alkoxysilane functional oligomer having the formula (3) or (4); at least one acrylate or methacrylate functional polyurethane acrylate oligomer having the formula (5); at least one hydroxyl terminated monoacrylate or monomethacrylate functional reactive diluent; a UV-absorber and hindered amine light stabilizer antioxidant; a wax capable of reducing oxygen inhibition; 1,3 dicarbonyl compound chelating agent; a thixotropic agent; an adhesion promoter.

17. The method of claim 10 wherein the composition comprises each of the following: at least one of at least one alkoxysilane functional oligomer having the formula (3) or (4); at least one acrylate or methacrylate functional polyurethane acrylate oligomer having the formula (5); at least one hydroxyl terminated monoacrylate or monomethacrylate functional reactive diluent; a UV-absorber and hindered amine light stabilizer antioxidant; a wax capable of reducing oxygen inhibition; 1,3 dicarbonyl compound chelating agent; a thixotropic agent; an adhesion promoter.

18. The method of claim 10 wherein the exposing is conducted by exposure to one or more of ultraviolet light, visible light, electron beam radiation, or combinations thereof.

19. The method of claim 10 wherein the exposing is conducted by exposure to one or more of ultraviolet light or visible light or combinations thereof in a range of from about 200 nm to about 500 nm range for from about 0.2 second to about 120 seconds, at an exposure intensity of from about 5 mW/cm$^2$ to about 2500 mW/cm$^2$.

20. The method of claim 10 wherein the exposing is conducted by exposure at a wavelength of from about 300 nm to about 465 nm.

21. The composition of claim 1 wherein from about 1 percent to about 20 percent by weight of at least one hydroxyl terminated monoacrylate or monomethacrylate functional reactive diluent component (d) is present in the composition.

22. The method of claim 10 wherein from about 1 percent to about 20 percent by weight of at least one hydroxyl terminated monoacrylate or monomethacrylate functional reactive diluent component (d) is present in the composition.

* * * * *